United States Patent
Ryan et al.

(10) Patent No.: US 12,206,747 B2
(45) Date of Patent: Jan. 21, 2025

(54) SYSTEM AND METHODS FOR PROVIDING DEVICE CONNECTIVITY SERVICES

(71) Applicant: Charter Communications Operating, LLC, St. Louis, MO (US)

(72) Inventors: James Ryan, Highlands Ranch, CO (US); John B. McManus, Englewood, CO (US); Michael McClure, Louisville, CO (US); Alan Robertson, Broomfield, CO (US); Aklilu Gebreyesus, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/940,622

(22) Filed: Sep. 8, 2022

(65) Prior Publication Data
US 2024/0089342 A1 Mar. 14, 2024

(51) Int. Cl.
*H04L 67/60* (2022.01)
*H04L 67/141* (2022.01)
*H04L 67/146* (2022.01)

(52) U.S. Cl.
CPC ............ *H04L 67/60* (2022.05); *H04L 67/141* (2013.01); *H04L 67/146* (2013.01)

(58) Field of Classification Search
CPC ...... H04L 67/60; H04L 67/141; H04L 67/146
See application file for complete search history.

(56) References Cited

U.S. PATENT DOCUMENTS

| | | | | |
|---|---|---|---|---|
| 2014/0317409 A1* | 10/2014 | Bartok | .................... | H04L 63/20 713/171 |
| 2016/0197834 A1* | 7/2016 | Luft | ........................ | H04L 12/46 709/223 |
| 2019/0190778 A1* | 6/2019 | Easterling | ............... | H04L 67/34 |
| 2021/0328864 A1* | 10/2021 | Hashimoto | ............. | G06F 9/453 |
| 2023/0231767 A1* | 7/2023 | Fordos | .................... | H04L 43/12 709/221 |

OTHER PUBLICATIONS

Atapattu, Kosala. "Understanding Ansible Strategy", medium.com website, Aug. 26, 2021 [retrieved on Aug. 26, 2021]. Retrieved from the Internet: <URL: https://medium.com/@kosala.atapattu/understanding-ansible-strategy-de8f95013ff4>. (Year: 2021).*

(Continued)

*Primary Examiner* — Thomas J Dailey
(74) *Attorney, Agent, or Firm* — Young Basile Hanlon & MacFarlane, P.C.

(57) ABSTRACT

Methods and systems for a device connectivity services system. A method for using the device connectivity services includes receiving a request to connect with a device to perform one or more tasks at the device, processing the request with respect to connectivity factors related to the request and the device, scheduling the request based on the connectivity factors, instantiating a controller to execute the one or more tasks at the device, sending commands to the device over a connection to perform the one or more tasks, and receiving responses from the device over the connection after completing the one or more tasks.

19 Claims, 12 Drawing Sheets

(56) References Cited

OTHER PUBLICATIONS

Orben, Patty. "Locking Simultaneous Access to Hosts in Ansible Playbooks", Github.com website, Sep. 24, 2021 [retrieved on Aug. 26, 2023]. Retrieved from the Internet: <URL: https://github.com/IBM/IBMDeveloper-recipes/blob/main/locking-simultaneous-access-to-hosts-in-ansible-playbooks/index.md>. (Year: 2021).*

"MQAnsibleconsumer project sourcecode file named consumer.py", Github.com website, 2016 [retrieved on Aug. 26, 2023]. Retrieved from the Internet: <URL: https://github.com/Kaydub00/mqansibleconsumer/blob/master/consumer.py>. (Year: 2016).*

Le et al. "Distributed back-pressure scheduling with opportunistic routing in cognitive radio networks", EURASIP Journal on Wireless Commn's and Networking, Mar. 4, 2015, Article No. 49. (Year: 2015).*

\* cited by examiner

SYSTEM AND METHODS FOR PROVIDING DEVICE CONNECTIVITY SERVICES

TECHNICAL FIELD

This disclosure relates to network device communications. More specifically, managing connectivity requests to a network device.

BACKGROUND

Service providers use a variety of devices on their network to provide services to customers. These devices are shared assets in the network. That is, multiple users and systems (collectively "requesting entity(ies)") need to access the devices for a multiplicity of reasons so as to provide the services to the customers. Network devices are not optimized to support multiple connections and are often configured to limit these sessions for performance reasons. Multiple connections via SSH sessions can lead to connection congestion and contention for or at the device, which can affect the services provided to the customers. Moreover, one or more of the devices may be provided by multiple vendors. Each vendor may use a custom or proprietary interface for their devices. Therefore, the requesting entity (ies) needs to know the language and features of each device or engage with multiple vendor-specific management systems.

The proprietary nature of vendor devices and network function solutions and the need to know the language and features of each device, manage the devices as part of a shared business service, and leverage repeatable and automated workflows and business process without custom and/or proprietary techniques is a need for many enterprises and service providers in the communications industry. Prior attempts to provide vendor-neutral approaches, such as NETCONF/YANG have largely been unrealized and the proprietary approach to modeling has further exacerbated the problem. Most service providers require hundreds to thousands of proprietary device endpoints. The business opportunity for a device vendor to offer this as a business service is limited as other device vendors are not incentivized to open up the management of their own devices to another vendor when they can charge a premium for management systems for their own product lines.

SUMMARY

Disclosed herein are methods and systems for managing device connectivity and associated features for multiple vendor devices operating in a service provider network.

In some implementations, a method includes receiving, at a device connectivity services system, a request to connect with a device to perform one or more tasks at the device, processing, by the device connectivity services system, the request with respect to connectivity factors related to the request and the device, scheduling, by the device connectivity services system, the request based on the connectivity factors, instantiating, by the device connectivity services system, a controller to execute the one or more tasks at the device, sending, by the controller, one or more commands to the device over a connection to perform the one or more tasks, and receiving, by the controller, responses from the device over the connection after completing the one or more tasks.

In some implementations, a service provider system includes a device connectivity services core configured to receive a connection request for a network device, apply connectivity factors related to the connection request and the network device, queue the connection request based on the connectivity factors, and determine a device connectivity services worker to control execution of tasks associated with connection request. The device connectivity services worker configured to establish a connection to the network device, send commands over the established connection to instruct the network device to perform tasks associated with the connection request, and obtain responses from the network device over the established connection after the network device has completed the tasks.

In some implementations, a device connectivity services system includes a device connectivity services core and a device connectivity services worker. The device connectivity services core configured to receive a connection request for a network device, apply connectivity factors related to the connection request and the network device to schedule the connection request on a queue, and publish the connection request and tasks related to the connection request on a message bus. The device connectivity services worker configured to pull the connection request and the tasks from the message bus, send commands to the network device to perform the tasks, and receive responses from the network device after the network device has completed the tasks.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
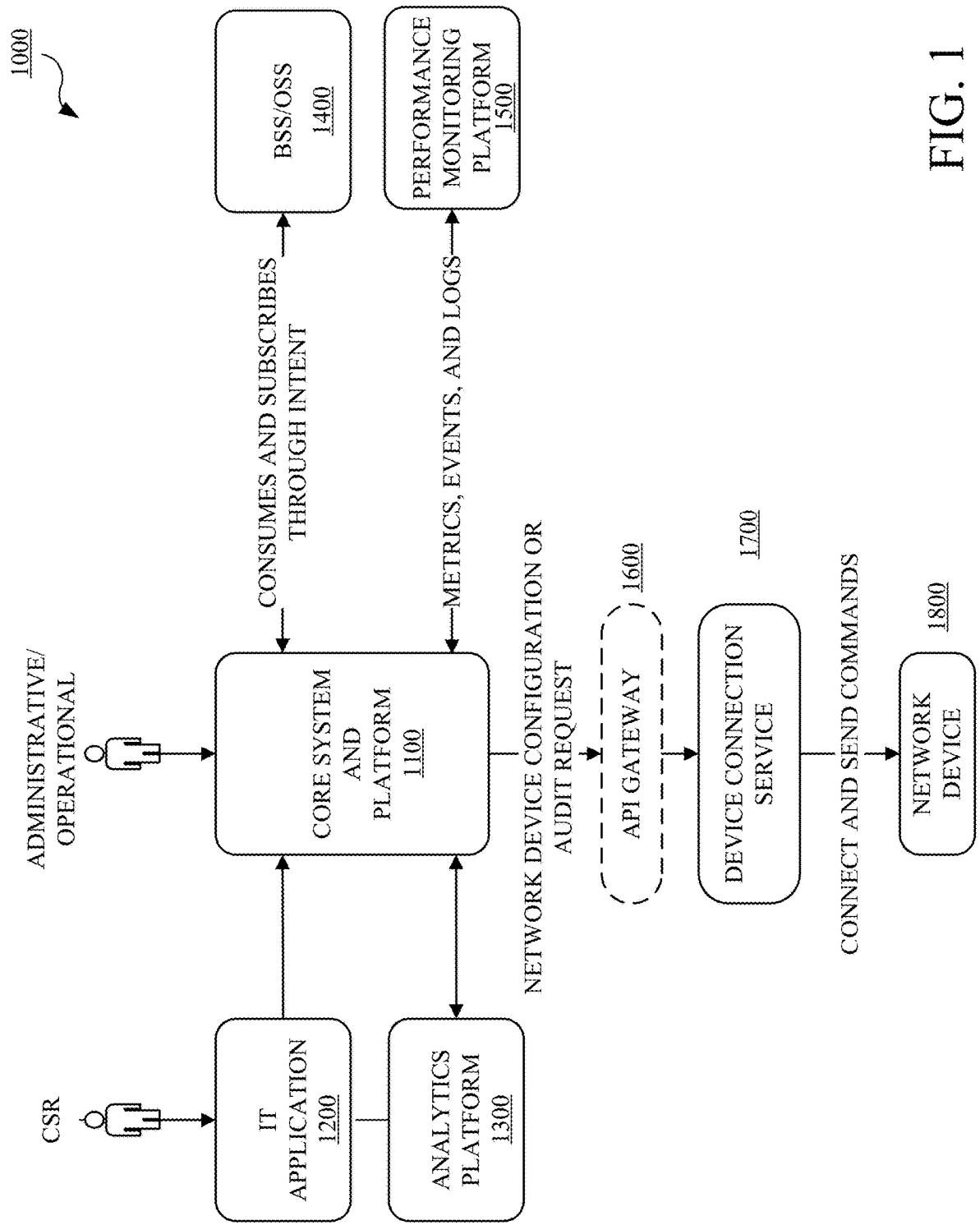
FIG. 1 is a diagram of an example of a device connectivity system or architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system or platform" includes any unit, or combination of units, capable of performing any method, or any portion or portions thereof, disclosed herein. For example, the "server", "computer", "computing device or platform", or "cloud computing system or platform" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for managing device connectivity across devices deployed in service provider networks, where the devices can be provided by multiple vendors and use custom or proprietary interface mechanisms. In this instance, device connectivity encompasses at least any act of system to system protocol aware negotiations for establishing, delivering, and formally ending a communication channel. In an example, in networks, devices are represented by network hardware components that establish a service provider topology for the selling, managing, and administering of services. Any resource that maintains an established method and/or protocol for distributed communication can be defined as a "device" that needs to be managed as an asset on the service provider network. Devices are shared assets in a network. In some implementations, devices can be modems, cable modem termination systems (CMTSs), routers, Network Functions Virtualization (NFV)/software defined networking (SDN), switches, cloud agents, and/or device agents.

The device connection or connectivity services (collectively "DCS") system described herein can funnel connectivity requests to the devices by accounting for and handling a variety of factors. The DCS system can ensure architecture is scale-out/-in capable and director services can manage concurrent and diverse DCS instances. The DCS system can establish a director store for distributed connection/device state. The DCS system can reduce latency and algorithmic cost of session and protocol establishment with durable session and identity statefulness.

The DCS system can manage communications between clients (i.e., requesting entities) and devices by including components and controllers which enable or implement one or more functionalities as described herein.

In some implementations, the one or more functionalities can include a back pressure queue to meter requests according to threshold capacity of the particular device. In some implementations, the one or more functionalities can include a policy-based, override-capable prioritization policy for request types and client privileges (job scoring), quota and throttling metrics based on device, transaction type, past performance, and the like to prevent overload of the devices.

In some implementations, the one or more functionalities can include a call-back reference for clients during post to query the state of their requests and ensure the connectivity services manage connection state in that resource. In some implementations, the one or more functionalities can include a mechanism to pause the queue or terminate current transactions and reorder the queue for the high priority (override) request(s). In some implementations, the one or more functionalities can include a mechanism for event-trigger/API-command connection termination that can rely on a store to query for existing managed connections. In some implementations, the one or more functionalities can include policy-based quota and throttling mechanisms for metering communication requests and queries. In some implementations, the one or more functionalities can include ordered sequencing in queue requests with configurable wait times between ordered requests (actual sequence and message payloads should be client responsibility).

In some implementations, the one or more functionalities can have secure shell (SSH) protocol and other protocols be made part of the device connection requests (e.g., SNMPv3, Netconf, Restconf, and the like). In some implementations, large payload return size from the device are calculated and stored in an intermediate data store, where clients can retrieve the results that would otherwise overwhelm the connection channel. In some implementations, the one or more functionalities can include a blocking policy based on expected request-type. In some implementations, the one or more functionalities can include which ensure device connections can be reserved against policy-based, device operating calendars and establish the ability to manage a logical collection of devices for time-specified execution. In some implementations, the one or more functionalities can include leverage policy-based authentication and authorization tooling and services to increase security footprint. In some implementations, the one or more functionalities can include leverage policy-based authentication and/or authorization capabilities and distributed transaction logging to capture device connectivity events. In some implementations, the one or more functionalities can include a protocol support catalog for clients to request connectivity and easily accessible API and feature documentation for clients.

In some implementations, the one or more functionalities can include a mechanism for determining existing established connections to an end point for routing subsequent messaging and commands to avoid fragmentation and guarantee sequencing. Opening connections between the DCS system and devices can require establishing a secure, authenticated, authorized well-defined protocol session between the DCS system and to the device, which can include, but is not limited to, network equipment, software component, or network function. The operational cost to open and establish connectivity between the DCS system and device is algorithmically expensive, i.e., in terms of time and/or resource cost due to the need for synchronous communication channels and calls to external resources to negotiate and establish.

The DCS system can establish authenticated/authorized identity (who and/or what) in an initial call and can route subsequent device messages and/or commands to a controller that has an established connection to the requested end-point device based on security and business policies (e.g., certificate expiration, system quota, etc.) This feature can be used in situations where messaging needs to be sequenced or metered or for a user who is troubleshooting a device and is providing commands based on responses from the device. The feature can also provide a data point that the scheduler can use to prioritize messages based on an identity (e.g., prioritizing an administrator role request over a standard operator/user). To accomplish this, the DCS system enables a stateful channel between the DCS system and the device being controlled without adding the overhead for negotiating a connection over and over and enabling a stream-like communication.

The DCS system and associated components, directors, controllers, and other elements as described herein can manage or handle a variety of device types from multiple vendors and a variety of device requests or communication requests as not all devices or communication requests are created equally. In some implementations, the DCS system can handle devices configured with access control lists, configured for prioritization of computing resources or prioritization settings, or which use a timeout mechanism to manage contention and congestion. In some implementations, the DCS system can manage instances where multiple clients need access to the device, where some client requests should be prioritized over other requests, where transactions do not complete and may or may not have a retry policy, where transactions compete with (and impact) data traffic thereby impacting customer services, and/or where there are business needs for immediate connectivity and/or forced connection terminations.

In some implementations, the DCS system can handle devices needing sequenced commands. In some implementations, the DCS system can handle devices needing acknowledgement and negative acknowledgement messaging. In some implementations, the DCS system can handle requests which will be small and finely tuned. In some implementations, the DCS system can handle requests which can be course and take hours to complete. In some implementations, the DCS system can handle requests which need to be established with a large collection of devices at once. In some implementations, the DCS system can handle requests which need to be rolled into a batch and scheduled to run at some predefined time (e.g., for either contractual maintenance window reasons or to reduce the risk of change activity impacting normal business hours). In some implementations, the DCS system can handle devices which rely on internal authentication/authorization methods but once the perimeter is breached, the connection has full privileges.

In some implementations, the DCS system can be used for troubleshooting and auditing device access, which can otherwise be difficult, time consuming, or impossible when a shared user/pass is used.

In some implementations, the DCS system can accommodate changing or evolving device protocols and APIs (in the case of patches, upgrades, OS versions, pluggables, cards, and the like) or as natural vendor refresh/replacement grooming takes place. Technical evolution in terms of software/hardware disaggregation, new paradigms such as model-driven APIs, proto buffer streams, and programmable components are accounted for without disrupting the services and clients that need to pass instructions or query the devices.

In some implementations, the DCS system and associated components, directors, controllers, and other elements can be implemented using microservices, containers, communication protocols, interface protocols, and software and libraries to integrate stated elements to support multi-vendor, multi-protocol abstraction.

The implementations of the DCS system described herein are functionally and operationally similar with respect to the features and characteristics described herein except as noted otherwise.

FIG. 1 is a diagram of an example of a system or network 1000 with a DCS system in accordance with embodiments of this disclosure. The network 1000 can include a core system and platform 1100, which can be connected to or be in communication with (collectively "connected to") one or more requesting entities such as, but not limited to, an IT application 1200, an analytics platform 1300, a business support systems (BSS)/operations support systems (OSS) 1400 and/or a performance monitoring platform 1500. The core system and platform 1100 can be connected to an API gateway 1600, which in turn can be connected to a DCS system 1700. In some implementations, the API gateway 1600 and the DCS 1700 can be integrated. The DCS system 1700 is connected to one or more devices 1800, i.e., network devices. In some implementations, one or more of the API gateway 1600 and the DCS system 1700 can be deployed on or integrated on a service provider cloud and/or platform. Communications between the described devices or elements can include wired communications, wireless communications, or a combination thereof. The network 1000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The core system and platform 1100 can be a set of software, workflows, interfaces, microservices, and/or datastores which can intake and process requests from the IT application 1200, the analytics platform 1300, the BSS/OSS 1400 and/or the performance monitoring platform 1500 and promulgate the request to the DCS system 1700 via the API gateway 1600, as applicable.

The IT application 1200 can enable a customer service representative 1210 to send a request to access the device 1800 via the core system and platform 1100, the API gateway 1600, and the DCS system 1700. For example, a request can be made for troubleshooting, changing configuration, and/or a variety of other reasons.

The analytics platform 1300 can receive information from and send requests to the DCS system 1700 and the device 1800, as appropriate and applicable. The information can be used to determine device 1800 performance and operation. Requests can be sent in response to data analytics.

The BSS/OSS 1400 can receive information from and send requests to the DCS system 1700 and the device 1800, as appropriate and applicable. The information can be used to determine device 1800 performance and operation. Requests can be sent in response to data analytics, to update configuration, and/or other reasons.

The performance monitoring platform 1500 can receive information from the DCS system 1700 and the device 1800, as appropriate and applicable. The information can be used to determine DCSE system 1700 and/or device 1800 performance and operation.

The API gateway 1600 is a server or mechanism which is a point of entry for routing requests and responses between the requesting entities such as the IT application 1200, the analytics platform 1300, the BSS/OSS 1400 and/or the performance monitoring platform 1500, for example, and the DCS system 1700.

The DCS system 1700 includes one or more microservices, containers, virtual machines, and/or other platforms which apply one or more policies and/or rules to generate appropriate components to process the request based on characteristics of the request and/or device.

The DCS system 1700 can include an API abstraction layer for managing backpressure, congestion, and contention for a wide variety of devices in the network 1000. The API abstraction layer hides the complexity of different proprietary vendors, types, protocols, command line interface (CLI) languages, device OS, features, physical/logical/virtual implementation, and unique constraints from system and operations (human) user requests/commands. The abstraction can apply to any device for which back pressure and congestion features are not available on the device including but not limited to routers, switches, CMTS, modems, WiFi equipment, customer premise equipment (CPE), NFV, SDN controller, complex software system, Internet of Things (IoT) and the like.

Multiple components of the DCS system 1700 provide policy-based configuration to prioritize requests, manage the quota for users, process security authorization and authentication, the scale out/in of connections, meter the requests, enqueue the requests, retry, cancel, suspend, reject, and schedule requests in a managed, policy-based system for all devices under management to reduce the risk of overloading the device, negatively impacting customer services riding on the device, and preventing unmanaged requests from consuming scarce device I/O and/or compute and storage resources.

The DCS system 1700 leverages microservice architecture and cloud native principles for scale, agility and evolvability. The component nature of the DCS system 1700 allows for components to be replaceable or can abstract multiple integrated components without impacting the overall solution through API, factory, and builder patterns (e.g., internal factory to connect to vendors A and B but requests a connection from vendor C's proprietary system). In some implementations, the DCS 1700 can be implemented using open source components.

Figure 2:
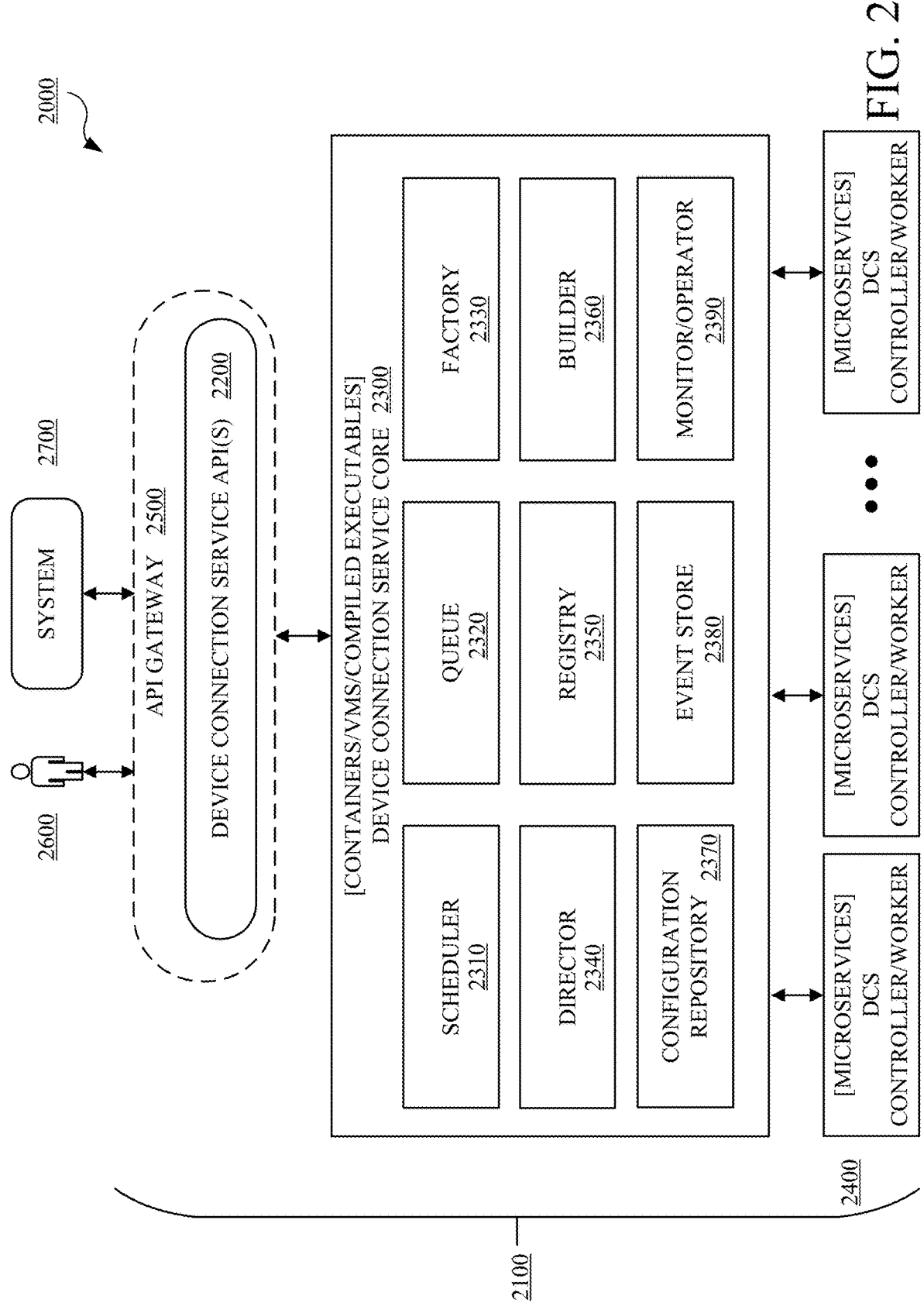
FIG. 2 is a diagram of an example of a device connectivity system or architecture in accordance with embodiments of this disclosure.

FIG. 2 is a diagram of an example of a network or system 2000 including a device connectivity system or architecture in accordance with embodiments of this disclosure. The network 2000 can include a DCS system 2100 in a distributed architecture. The DCS system 2100 can include a DCS API(s) 2200, a DCS core 2300, and DCS controller or workers 2400. In some implementations, the network 2000 can include an API gateway 2500. In some implementations, the API gateway 2500 and the DCS API(s) 2200 can be integrated. User(s) 2600 and systems 2700 can send requests to network devices (as shown in FIG. 1) via the API gateway 2500 and the DCS system 2100, as appropriate and applicable. In some implementations, one or more of the API gateway 2500, the DCS API(s) 2200, a DCS core 2300, and DCS controller or workers 2400 can be deployed as multiple microservices, containers, virtual machines, compiled executables, and the like. Communications between the described devices or elements can include wired communications, wireless communications, or a combination thereof. The network 2000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The DCS system 2100 includes one or more microservices, containers, virtual machines, and/or other platforms which apply one or more policies and/or rules to generate appropriate components to process the request based on characteristics of the request and/or device.

The DCS API(s) 2200 can manage backpressure, congestion, and contention on the DCS system 2100 for a wide variety of devices in the network 2000. The DCS API(s) 2200 hides the complexity of different proprietary vendors, types, protocols, command line interface (CLI) languages, device OS, features, physical/logical/virtual implementation, and unique constraints from system and operations (human) user requests/commands.

The DCS core 2300 can include multiple components including, but not limited to, a scheduler 2310, a queue 2320, a factory 2330, a director 2340, a registry 2350, a builder 2360, a configuration repository 2370, an event store 2380, and a monitor or operator 2390.

The scheduler 2310 and the queuing service 2320 can schedule and queue device commands and operations requests. The scheduler 2310 and the queuing service 2320 can manage device contention, provide load balancing logic, and queuing. The scheduler 2310 can ensure prioritization of competing device requests, validate real-time and future job requests against a policy-enabled device calendar to ensure requests do not impact outages, calendar maintenance, enforce moratoriums, and the like. The scheduler 2310 can handle and process future date works, recurring jobs, and ad-hoc requests. The queuing service 2320 can ensure device requests are captured and managed efficiently as a queryable resource on the DCS services 2100.

Figure 5:
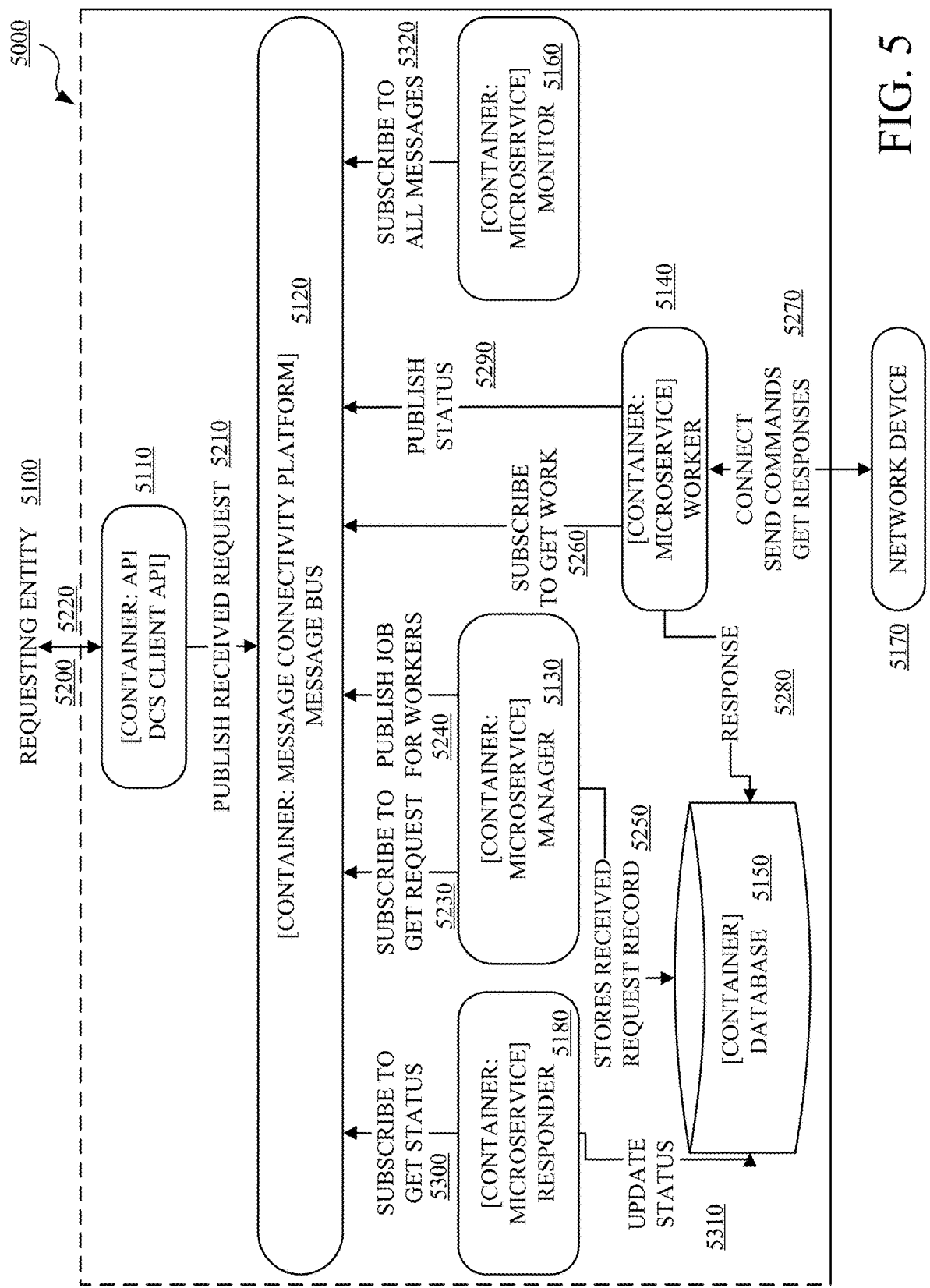
FIG. 5 is an example flow diagram for a device connectivity system or architecture in accordance with embodiments of this disclosure.

The director 2340 can validate requests, facilitate client (requesting entity) state requests, and direct validated work, tasks, or jobs to managers for work execution. In some implementations, the managers can be deployed as components in the core 2300 or distributed outside of the core as shown in FIG. 5 and/or FIG. 6, for example. The managers provide an abstraction capability to horizontally scale the controller/workers 2400. Deployment or organization of the managers can be defined by business policy. For example, managers can be organized by vendor type, by message type, by protocol, by a set of configuration properties in the repository, and/or combinations thereof. This enables organization of the scope of the work that controllers/workers 2400 are assigned in a variety of ways.

The managers can execute the instructions from the director 2340 by calling factories 2330 to get appropriate DCS controllers/workers 2400 to support vendor specific/ job specific device connectivity protocols and features. The managers can provide update to the director 2340 with regard to device connectivity progress and state.

The factory 2330 can create instances of the DCS controllers/workers 2400. The builder 2360 can build the connection pool for a DCS controller/worker 2400. The factory 2330 and the builder 2360 can manage the lifecycle and associated activities of the DCS controllers/workers 2400. Other techniques can be used.

The registry 2350 can manage device connection states and can include a durable store.

The configuration repository 2370 can store configuration and properties of the DCS service 2100 to support instrumentation and observability, device management, protocol management including interface and communication protocols, and management of the DCS service properties.

Figure 6:
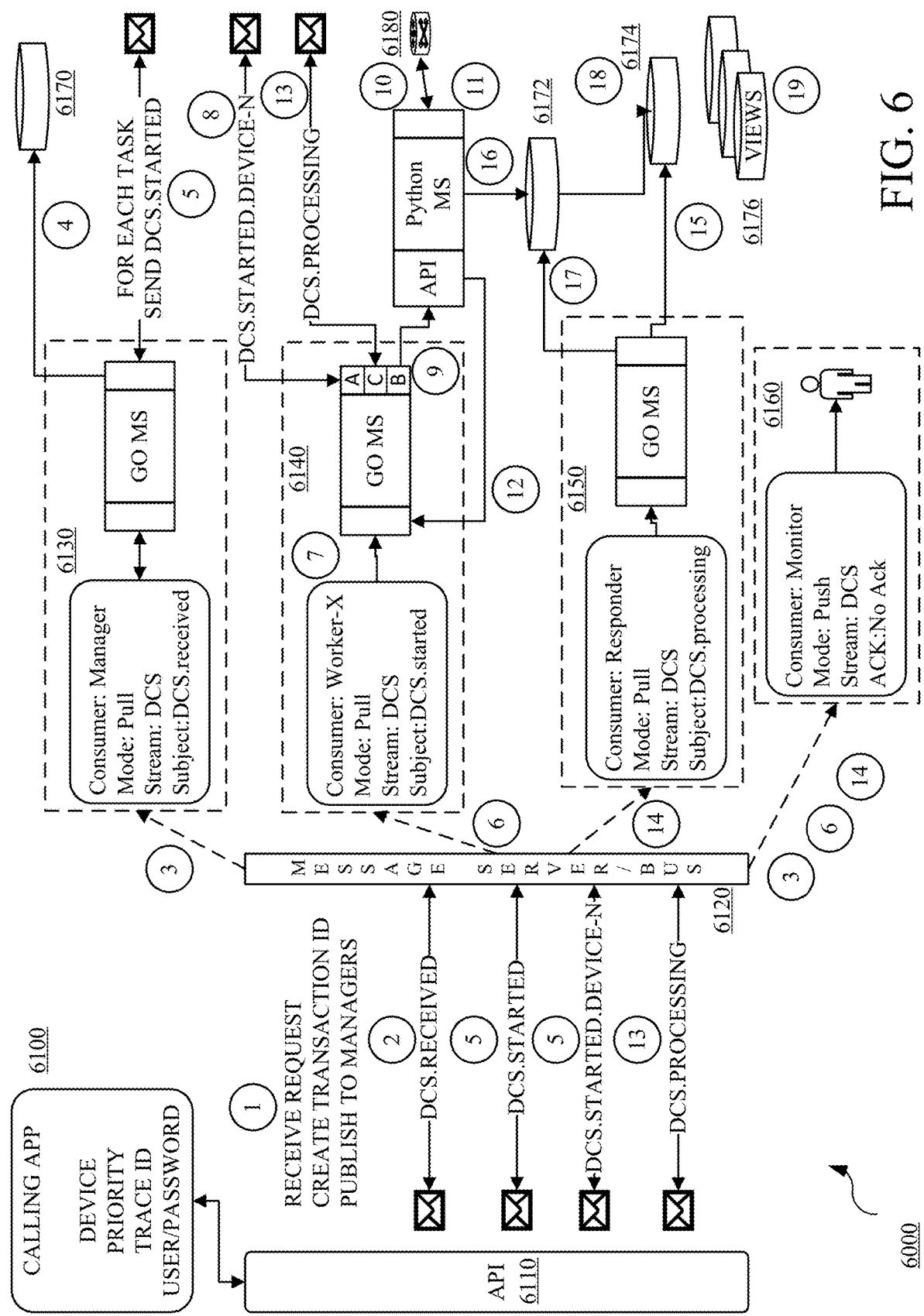
FIG. 6 is an example flow diagram for a device connectivity system or architecture in accordance with embodiments of this disclosure.
Figure 7:
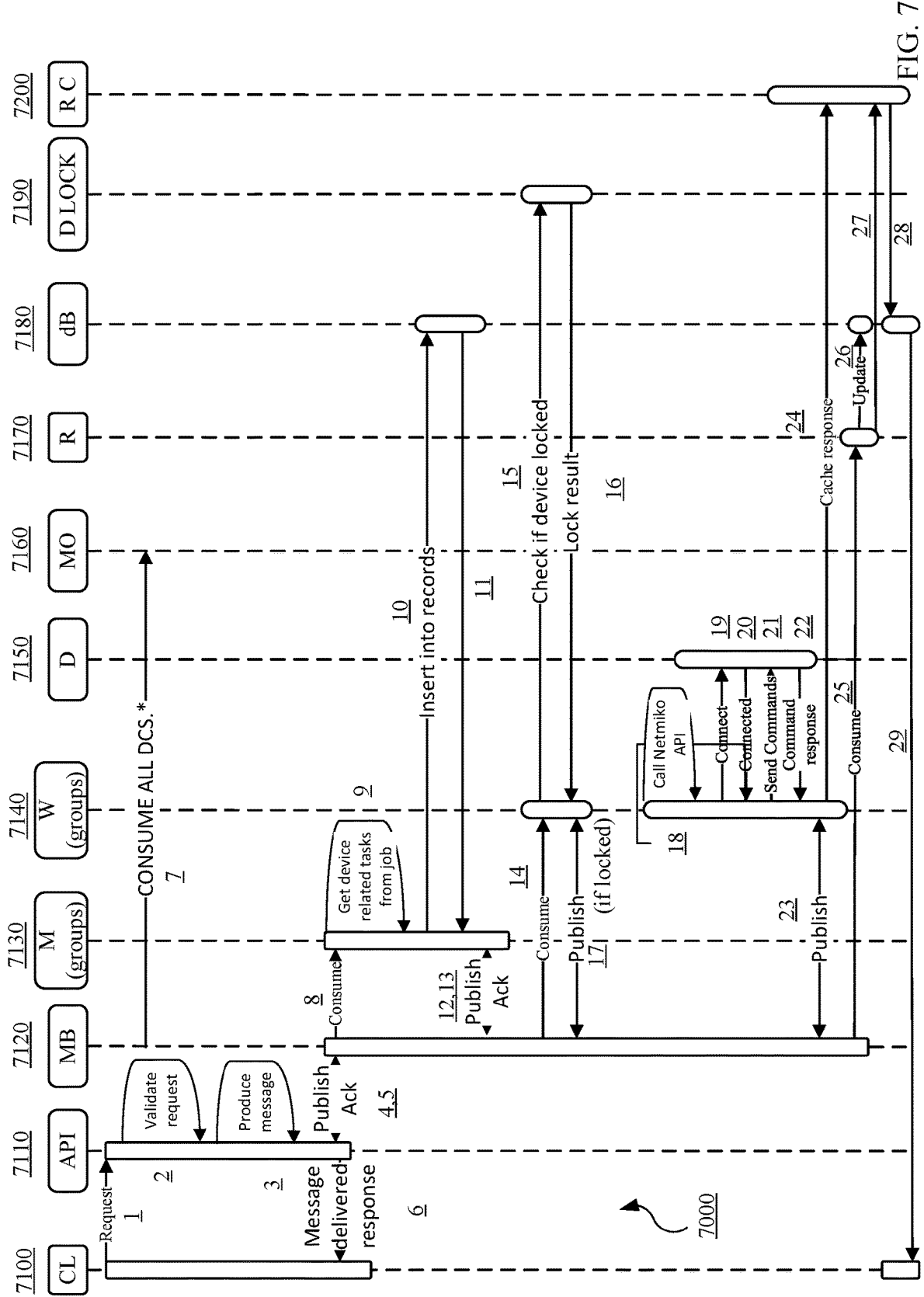
FIG. 7 is an example swim diagram for a device connectivity system or architecture in accordance with embodiments of this disclosure.

The event store 2380 can record events including logging DCS local and distributed events. The events can include, but are not limited to, transaction event changes, operational events, performance events, failure/success events, actual device responses, logging messages that log code events for inspection (i.e., got user from the vault successfully), information from the codebase to give an operator insight into the functioning of the system, and others as shown in FIG. 6 and FIG. 7.

The monitor or operator 2390 can manage a health of the DCS system 2100, monitor the DCS system 2100, execute self-heal techniques as needed, and execute ad-hoc deep pinging for status and state. That is, the monitor or operator 2390 can monitor and notify of lifecycle state of the DCS system 2100 and components to ensure cloud microservice features of tracing, logging, performance monitoring, auto scaling and self-heal.

The DCS controllers/workers 2400 can process and manage vendor specific protocol negotiation and command protocol execution for the device connection requests. The DCS controllers/workers 2400 can be serverless ad-hoc worker processes that are spun up on demand or can be long-lived controllers responsible for n number of vendor/ custom network end points and devices.

Figure 3:
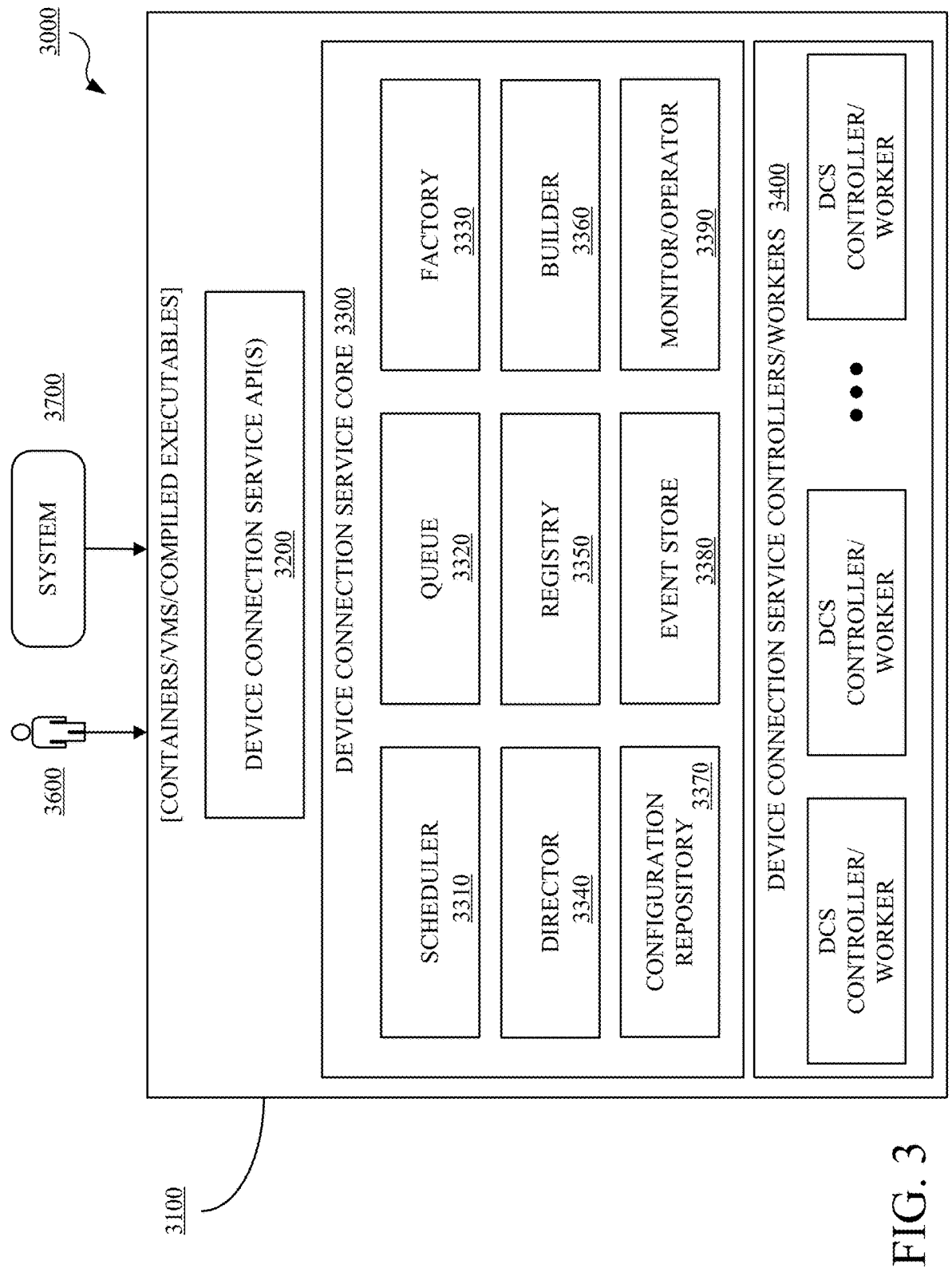
FIG. 3 is a diagram of an example of a device connectivity system or architecture in accordance with embodiments of this disclosure.

FIG. 3 is a diagram of an example of a network or system 3000 including a DCS system in accordance with embodiments of this disclosure. The network 3000 can include a DCS system 3100 in a monolithic architecture. The DCS system 3100 can include a DCS API(s) 3200, a DCS core 3300, and DCS controller or workers 3400. User(s) 3600 and systems 3700 can send requests to network devices (as shown in FIG. 1) via the DCS system 3100. In this instance, the DCS API(s) 3200, the DCS core 3300, and the DCS controller or workers 3400 can be functionally deployed as a single unit of functionality, i.e., a microservice, container, virtual machine, compiled executable, and the like. The elements of system 3000 are functionally and operationally similar to the system 2000. Communications between the described devices or elements can include wired communications, wireless communications, or a combination thereof. The network 2000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

Operationally, with respect to FIGS. 1-3, a request to connect to perform a task or a job (collectively "request") at a device is received from a requesting entity, i.e., the IT application 1200, the analytics platform 1300, the BSS/OSS 1400 and/or the performance monitoring platform 1500 of FIG. 1. The DCI API or API gateway, i.e., DCS API(s) 2200 and/or API gateway 2500 of FIG. 2, can process the request irrespective of interface and/or protocol used for the request. After processing, the DCI API or API gateway sends the request to the scheduler, i.e., the scheduler 2310 of FIG. 2. With respect to the relevant device, the scheduler can validate and review the request in view of pending requests, the priority of the request, the impact of the request on device operations, the type of request, against calendared outages, items, or events for the device, against moratoriums, and other factors. The priority can be based on type of requesting entity. For example, whether it is a CSR, a system request, a configuration request, and/or a maintenance request. The queuing service, i.e., the queuing service 2320 of FIG. 2, can then queue the request in a queue for the device.

The director, i.e., the director 2340 of FIG. 2, receives the jobs and/or tasks associated with the request and initiates the factory and builder, i.e., the factory 2330 and the builder 2360 of FIG. 2, to generate an instance of controller, i.e., the controllers 2400 of FIG. 2, which is then connected to the device. The registry, the configuration repository, and the event store, i.e., the registry 2350, the configuration repository 2370, and the event store 2380 of FIG. 2, store the appropriate information. The controllers can perform the jobs and tasks and relay data and messages back toward the requesting entity via the DCS system.

Figure 4:
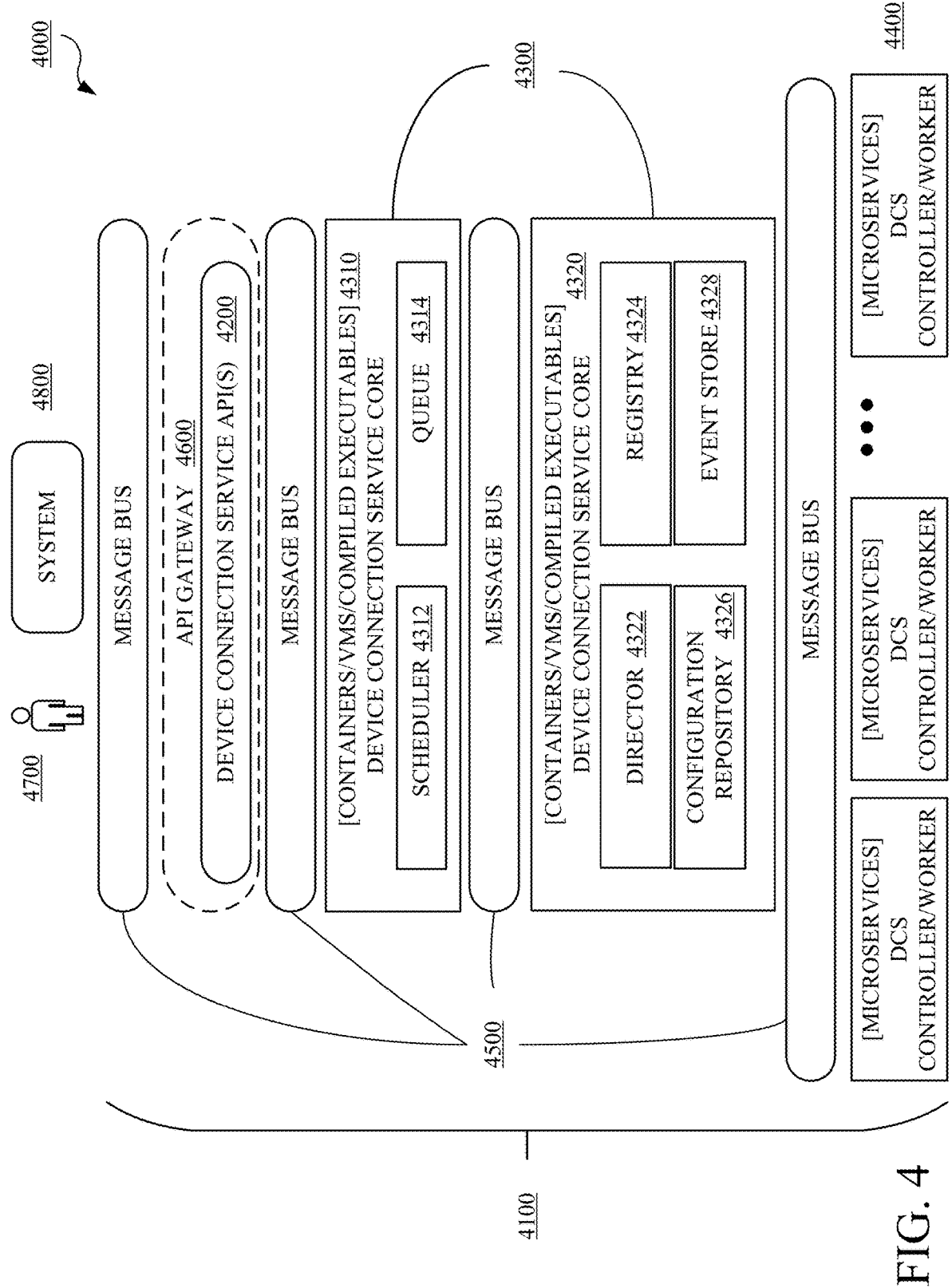
FIG. 4 is a diagram of an example of a device connectivity system or architecture in accordance with embodiments of this disclosure.

FIG. 4 is a diagram of an example of a network or system 4000 including a DCS system or architecture in accordance with embodiments of this disclosure. The network 4000 can include a DCS system 4100 in an event driven architecture. The DCS system 4100 can include a DCS API(s) 4200, a two-level DCS core 4300, and DCS controller or workers 4400, which are connected via a message bus and/or platform 4500. In some implementations, the network 2000 can include an API gateway 4600. In some implementations, the API gateway 4600 and the DCS API(s) 4200 can be integrated. User(s) 4700 and systems 4800 can send requests to network devices (as shown in FIG. 1) via the API gateway 4600 and the DCS system 4100, as appropriate and applicable. In some implementations, one or more of the API gateway 4600, the DCS API(s) 4200, the DCS core 4300, and the DCS controller or workers 4400 can be deployed as multiple microservices, containers, virtual machines, compiled executables, and the like. Communications between the described devices or elements can include wired communications, wireless communications, or a combination thereof. The network 4000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The DCS system 4100 includes one or more microservices, containers, virtual machines, and/or other platforms which apply one or more policies and/or rules to generate appropriate components to process the request based on characteristics of the request and/or device.

The DCS API(s) 4200 can manage backpressure, congestion, and contention on the DCS system 4100 for a wide variety of devices in the network 4000. The DCS API(s) 4200 hides the complexity of different proprietary vendors, types, protocols, command line interface (CLI) languages, device OS, features, physical/logical/virtual implementation, and unique constraints from system and operations (human) user requests/commands.

The two-level DCS core 4300 can include a first level DCS core 4310 and a second level DCS core 4320. The first level DCS core 4310 can include, but not limited to, a scheduler 4312 and a queue or queuing service 4314. The second level DCS core 4320 can include, but is not limited to, a director 4322, a registry 4324, a configuration repository 4326, and an event store 4328. In some implementations, the DCS system 4100 can include a monitor service as described herein.

The scheduler 4312 and the queuing service 4314 are functionally equivalent to the scheduler 2310 and the queuing service 2320 except with the usage of the message bus and/or platform 4500 as described herein.

The director 4322 can validate requests, facilitate client (requesting entity) state requests, and direct validated work, tasks, or jobs using event-based rules and the message bus and/or platform 4500 to create instances of the DCS controllers/workers 4400.

The registry 4324, a configuration repository 4326, and an event store 4328 are functionally equivalent to the registry 2350, the configuration repository 2370, and the event store 2380 except with the usage of the message bus and/or platform 4500 as described herein.

The DCS controllers/workers 4400 are functionally equivalent to the DCS controllers/workers 2400 except with the usage of the message bus and/or platform 4500 as described herein.

The message bus and/or platform 4500 enables pushing and pulling of messages and events between each of the components of the DCS system 4100 as described herein.

Operationally, with respect to FIGS. 1 and 4, the message bus enables an event drive process, where event-based rules result in messages/events being pushed to the message bus by some DCS components and being pulled by some DCS components to facilitate processing of the request.

A request is received from a requesting entity, i.e., the IT application 1200, the analytics platform 1300, the BSS/OSS 1400 and/or the performance monitoring platform 1500 of FIG. 1 via the message bus, i.e., the message bus 4500. The DCI API or API gateway, i.e., DCS API(s) 4200 and/or API gateway 4600 of FIG. 4, can receive or pull the request and process the request irrespective of interface and/or protocol used for the request. After processing, the DCI API or API gateway places the request on the message bus. The scheduler, i.e., the scheduler 4312 and the queueing service 4314 of FIG. 4, can process as described herein and place the request with messages on the message bus 4500 accordingly. In this instance, the director, i.e., the director 4322 can pull the request from the message bus, process, and push the request with jobs/task on the message bus. Pushing of the request results in the generation of an instance of controller, i.e., the controllers 4400 of FIG. 4, which is then connected to the device. The registry, the configuration repository, and the event store, i.e., the registry 4324, the configuration repository 4326, and the event store 4328 of FIG. 4, store the appropriate information. The controllers can perform the jobs and tasks and relay data and messages back toward the requesting entity via the message bus and the DCS system.

FIG. 5 is an example flow diagram 5000 for a DCS system or architecture in accordance with embodiments of this disclosure. The flow diagram is operative between a requesting entity 5100, a DCS API 5110, a message bus 5120, a manager 5130, a controller/worker 5140, a database 5150, a monitor 5160, a network device 5170, and a responder 5180. The flow diagram 5000 can be used with the system 4000 of FIG. 4. The communications between the described devices or elements can include wired communications, wireless communications, or a combination thereof. The flow diagram 5000 and elements therein are illustrative and may include additional, fewer, or different steps, flows, devices, entities, and the like which may be similarly or differently architected without departing from the scope of the specification and claims herein.

The requesting entity 5100 can send a request, for example, an audit request or a configuration change request, to the DCS API 5110 (5200). The DCS API 5110 can publish the request to the or on the message bus 5120 (5210) and send an acknowledgement to the requesting entity 5100 (or a client on the requesting entity 5100) (5220). The message bus 5120 is a connective technology responsible for addressing, discovery, and exchange of messages. The message bus 5120 can be a distributed message streaming system that uses a publish and subscribe messaging pattern. Placement of messages and the like enable event-driven DCS system operation via the publish and subscribe processes. The message bus 5120 may provide persistence (file or memory-based), enable reading of messages from specific times or message sequences, delivery options, message storage, security, scalability, replay, and other characteristics.

The manager 5130 can subscribe to get or pull new messages associated with the request (5230). The manager 5130 can process the request, select the controllers/workers for the jobs associated with the request, and publish the job on the message bus 5120 for access by the controllers/workers (5240). The number of managers generated or pruned are dependent on demand or request activity. The manager 5130 can store the messages and request to the database 5150 (5250). In some implementations, the database 5150 can be the persistent store with respect to the registry, the configuration repository, and/or the event store as described herein.

The controller/worker 5140 can subscribe to get or pull the job from the message bus 5120 (5260). The controller/worker 5140 is responsible for the activity necessary to connect to the network device 5170, send commands to the network device 5170 to execute the jobs, and obtain responses from the network device 5170 (5270). The controller/worker 5140 can store the response in the database 5150 (5280). The controller/worker 5140 can publish the status of the job and/or request to the or on the message bus 5120 (5290).

The responder 5190 can subscribe to the message bus 5120 to obtain the status of the job and/or request (5300) and update the database 5150 accordingly (5310). Responders, such as responder 5190, can be instantiated upon establishment of a connection to a device, such the network device 5170. Responders can reside in the same space as the controller/workers. The responders are components similar to the workers, but their responsibility is to track status and completions of the work started by the workers. The responders handle the output from a connected device. The responders are the components responsible for the capture, processing, formatting, and storage of the information or data that is retrieved from a device. For example, the information or data can include forwarding tables in a router, the configuration of a CMTS, OIDs/MIBs from a device, statistics/counters from a network router, etc. The monitor 5160 can monitor the health of the DCS system in terms of the queue status, connections status, and/or other DCS system operations by subscribing to the message bus 5120 for all published messages (5320).

FIG. 6 is an example flow diagram 6000 for a device connectivity system or architecture in accordance with embodiments of this disclosure. The flow diagram 6000 is operative between a requesting entity 6100, a DCS API 6110, a message bus 6120, a manager 6130, a controller/worker 6140, a responder 6150, a monitor 6160, a database 6170, a cache 6172, a database 6174, databases 6176, and a device 6180. In some implementations, the database 6170, the database 6174, and the databases 6176 can be one database. The flow diagram 6000 can be used with the system 4000 of FIG. 4. The communications between the described devices or elements can include wired communications, wireless communications, or a combination thereof. The flow diagram 6000 and elements therein are illustrative and may include additional, fewer, or different steps, flows, devices, entities, and the like which may be similarly or differently architected without departing from the scope of the specification and claims herein.

The requesting entity 6100 can send a request, for example, an audit request or a configuration change request, to the DCS API 6110. The request can include, but is not limited to, requesting entity information, device, priority, trace_ID, and/or user and password for access to the device 6180. The DCS API 6110 can receive the request, create a transaction ID, publish the request to the or on the message bus 6120 (1) and send an acknowledgement to the requesting entity 6100 (or a client on the requesting entity 6100 (2).

The manager 6130 can pull messages associated with the request (3) and use a work queue processor (MS) to update records in the database 6170 (4) and send a message to the requesting entity 6100 that request processing has started (5). The manager 6130 can process the request, breakdown the job to tasks to be consumed by controllers/workers, select the controllers/workers for the jobs associated with the request, and publish the job on the message bus 6120 for access by the controllers/workers. The number of managers generated or pruned are dependent on demand or request activity.

The controller/worker 6140 can pull the job from the message bus 6120 (6). The controller/worker 6140 can use a work queue processor (MS) to check if the device 6180 is locked by another worker, i.e., device is already processing a request (7). If the device is locked, the work queue processor (MS) of the controller/worker 6140 sends a message accordingly (8). If the device is locked, a worker prepends the message with the locked device primary key in the message, where it is subsequently queued. This prevents the next available random worker from trying to process this message. This also ensures that only the worker with the active lock on the device works the task. This pattern addresses commands and/or jobs that are broken up into sequences or chunks of activity. This pattern also increases performance of the services as the worker with the device locked does not have to navigate the overhead in opening back-up a session for that transaction. The pattern also prevents multiple workers from trying to connect to the same device, which could create sequencing issues as well as connection pool issues. These topics and/or features are further discussed with respect to FIG. 8. If the device 6180 is not locked, the controller/worker 6140 locks the device 6180, subscribes to the device 6180, and executes processing to send commands to the device 6180 using a work queue processor (MS netmiko) (9). The work queue processor (MS netmiko) connects to the device 6180 to send commands (10). The work queue processor (MS netmiko) receives status and responses from the device 6180 (11). The work queue processor (MS netmiko) sends the status to the work queue processor (MS) (12) and processing status to the requesting entity 6100 (13).

The responder 6150 can pull the processing status from the message bus 6120 (14). The responder 6150 can use a work queue processor (MS) to update status at the database 6172 (15). The work queue processor (MS netmiko) can update the cache 6172 with the response (16). The cache 6172 is triggered by the work queue processor (MS) (17) to update the database 6174 with the response (18). This information can be used to present different views for analytical purposes and the like via databases 6176 (19). The monitor 6160 can pull and push message streams (3, 6, and 14) to analytic systems and the like. References to GO MS, Python MS, MS netmiko are illustrative and other languages and/or libraries can be used within the scope of the specification and claims described herein.

FIG. 7 is an example swim diagram 7000 for a device connectivity system or architecture in accordance with embodiments of this disclosure. The swim diagram 7000 is operative between a client (CL) 7100 (e.g., a requesting entity), a DCS API 7110, a message bus (MB) 7120, a manager (M) 7130, a controller/worker (W) 7140, a device (D) 7150, a monitor (MO) 7160, a responder (R) 7170, a database (dB) 7180, a device lock status (DLOCK) 7190, and a response cache (RC) 7200. In some implementations, the database (dB) 7180, the device lock status (DLOCK) 7190, and the response cache (RC) 7200 can be one database. The swim diagram 7000 can be used with the system 4000 of FIG. 4. The communications between the described devices or elements can include wired communications, wireless communications, or a combination thereof. The swim diagram 7000 and elements therein are illustrative and may include additional, fewer, or different steps, flows, devices, entities, and the like which may be similarly or differently architected without departing from the scope of the specification and claims herein.

The requesting entity 7100 can send a request to the DCS API 7110. The request can include, but is not limited to, requesting entity information, device, timestamp, priority, region, trace_ID, and/or other information (1). The DCS API 7110 can validate the request (2), create a message for publication on the message bus 7120 (3), publish the message on the message bus 7120 (4), receive an acknowledgement from the message bus 7120 (5), and send an acknowledgement to the client 7100 (6). All messages on the message bus 7120 are pushed to or pulled by the monitor 7160 (7).

The manager 7130 can pull messages associated with the request (8) and generate tasks (9). The manager 7130 can store the request, tasks, and commands (operational records) in the database 7180 (10) and receive an acknowledgement thereof (11). The manager 7130 can publish the request, tasks, and commands on the message bus 7120 (12) and receive acknowledgement thereof (13).

The worker 7140 can pull the request, tasks, and commands from the message bus 7120 (14), send a message to determine if the device 7150 is locked (15), and receive a device lock determination or result based on the device lock record 7190 (16). If the device 7150 is locked, the worker 7140 can publish the device lock status on the message bus 7120 (17). If the device 7150 is not locked, the worker 7140 can call the device 7150 via an API (18) to connect with the device 7150 (19) and (20), send commands (21) and receive responses (22). The worker 7140 can publish the processing status (23) and cache the response in the response cache 7200 (24).

The responder 7170 can pull the processing status from the message bus 7120 (25), update the operational records in the database 7180 (26) and trigger the response cache 7200 when the tasks are complete (27). The response cache 7200 can push the response record to the database 7180 when triggered (28), which in turn is pulled by or pushed to the client 7100 (29).

Figure 8:
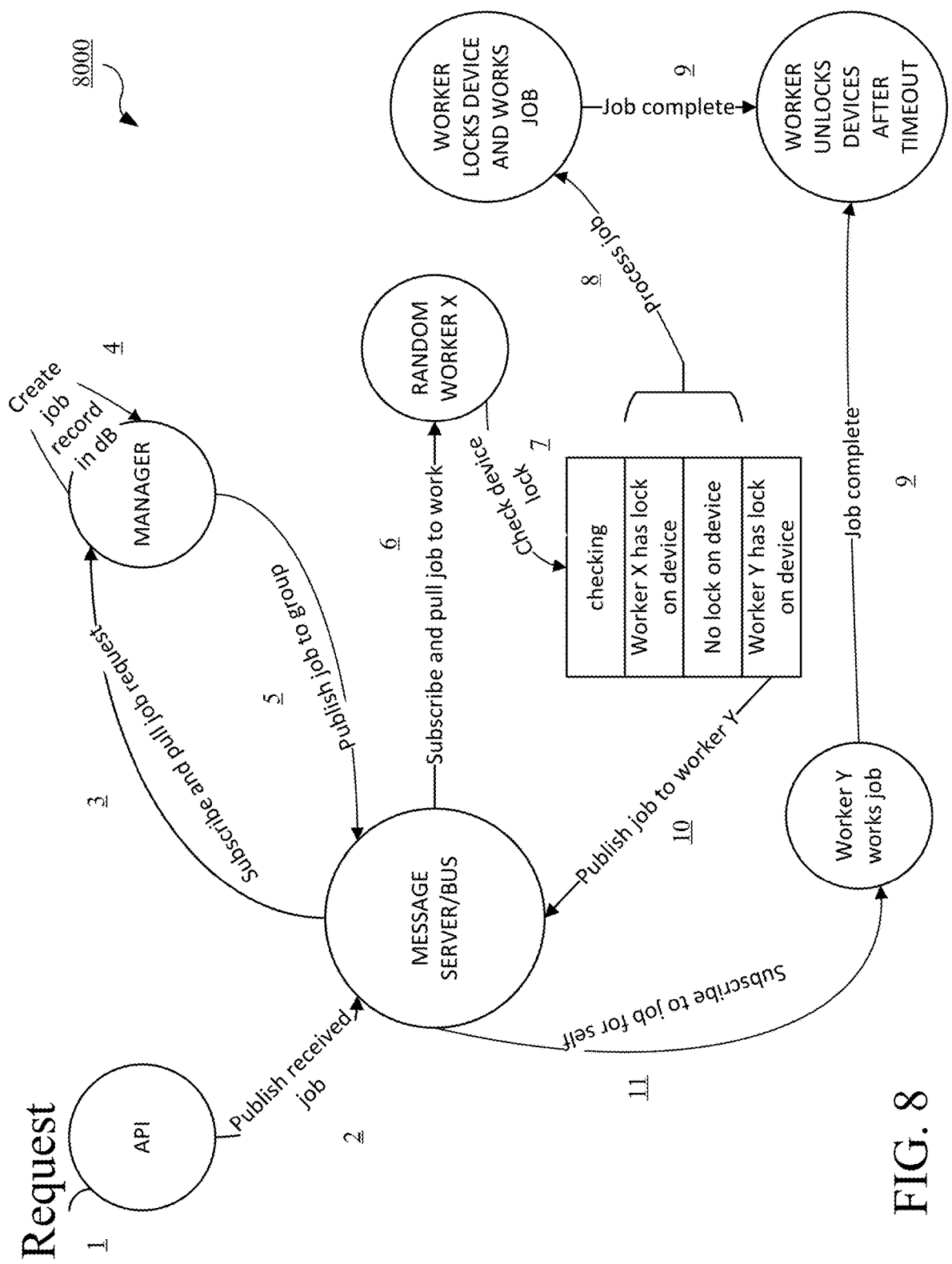
FIG. 8 is an example state diagram for a device connectivity system or architecture in accordance with embodiments of this disclosure.

FIG. 8 is an example state diagram 8000 for a DCS system in accordance with embodiments of this disclosure. An API 8100 can receive a request for a device connection and a job associated with or in the request (1). The received request and job are published on a message queue on a message bus 8200 (2). A manager 8300 subscribing to the message bus 8200 can pull the request and job and responds back to the API with a transaction ID (3). The manager 8300 can store the request and job in a database (4). The manager 8300 can publish the job on the message bus 8200 to a group of workers (5). Workers subscribe to the message bus 8200 for messages from the manager 8300. A subscribed worker 8400 (worker X) can pull the job to perform the work associated with the job (6). The subscribed worker 8400 can perform a device lock determination (7).

If there is no lock on the device by another worker, and worker 8400 is not processing with another device, then the worker 8400 can lock the device, connect to the device, send commands to the device, and obtain responses from the device (8). When complete, the worker 8400 can wait for a time-out period and unlock the device (9).

If another worker 8500 (worker Y) has a lock on the device, then the job is published on the message bus 8200 for only that worker 8500 (10). The worker 8500 can subscribe for self messages, resets timer, unsubscribes from group messages, obtains job, and executes job (11). Each worker has an internal timer related to locking of a device via a configuration property in a configuration and property repository such as, for example, the configuration repository 4326. The internal timer enables a worker to keep the session open between it and the device for the situation where several messages to the same device are sequenced. Effectively, the worker can set itself to a state that the worker is no longer available for any other work not directed to that particular device (labeled as 'subscribe to job for self'), resets the internal timer, and unsubscribes from the Group. As there is no equivalent to an end task, the worker remains open until a time out threshold is reached where the worker will end the connection to the device and based on its policy, either unsubscribe to self and re-subscribe to Group or when the controllers are on-demand, shutdown and return compute resources back to the container (known as scale-in). In an illustrative example, three fictitious commands to a device come in 1) pre-audit, 2) change some configuration entry, and 3) post-audit. As described above, the worker pulls from the queue by being 'subscribed to Group'. For simplicity, there is no current lock on the device. Worker Y subscribes to self, starts timer, unsubscribes to Group and processes message 1. If another worker picked up message 2 or 3, they would find the device locked by Worker Y and relabel the messages with the device that Worker Y is working on and re-queue the message. Now only Worker Y subscribed to self (effectively messages 2 and 3) will work the messages in the queue. After message 3, Worker Y sits connected to the device until another message comes into the queue labeled for that device or the timeout threshold is matched (say 30 seconds). Worker Y then releases the device connection, re-subscribes to Group, unsubscribes to Self and picks up the next group message (i.e., a message that is not labeled to a particular device) and the process continues. When complete, the worker 8500 can wait for a time-out period and unlock the device (9).

Figure 9:
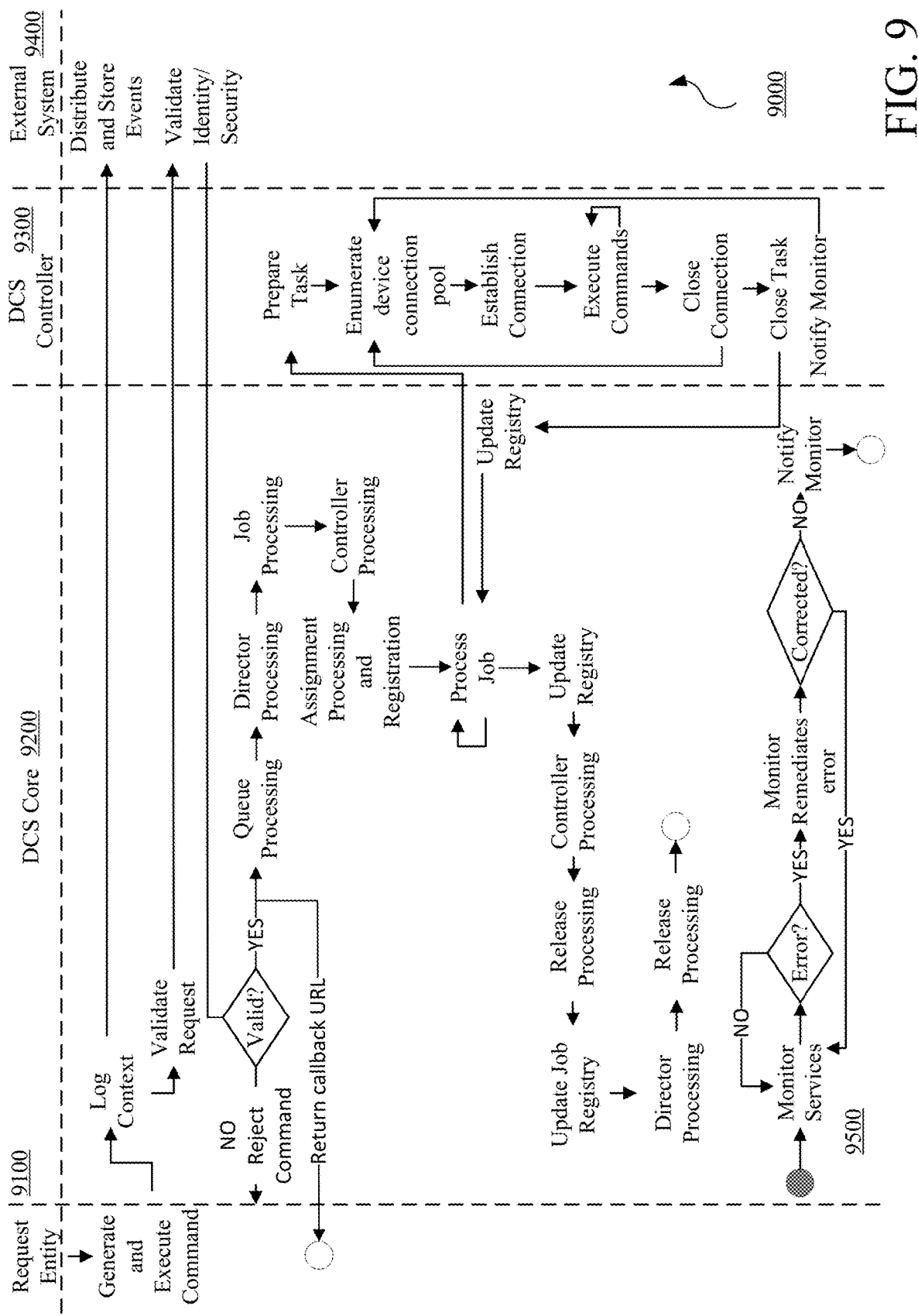
FIG. 9 is an example swim diagram for a device connectivity system or architecture in accordance with embodiments of this disclosure.

FIG. 9 is an example swim diagram 9000 for a DCS system in accordance with embodiments of this disclosure. The swim diagram 9000 is operative between a requesting entity 9100, a DCS core 9200, a DCS controller 9300, an external system and/or database 9400, and a monitor 9500. The swim diagram 9000 can be used with the system 1000 of FIG. 1, the system 2000 of FIG. 2, the system 3000 of FIG. 3, the system 4000 of FIG. 4, the system 5000 of FIG. 5, and use the flow or swim diagrams of FIGS. 6-8, as appropriate and appliable. The communications between the described devices or elements can include wired communications, wireless communications, or a combination thereof. The swim diagram 9000 and elements therein are illustrative and may include additional, fewer, or different steps, flows, devices, entities, and the like which may be similarly or differently architected without departing from the scope of the specification and claims herein.

The requesting entity 9100 can send a request, which can then be used to generate commands for execution with respect to the request. The request can be stored in the external system and/or database 9400 and can be validated by the external system and/or database 9400. If the request is invalid, the commands are rejected and the requesting entity 9100 is notified. If the request is valid, a return URL is sent to the requesting entity 9100 and DCS core 9200 processing can be initiated.

The DCS core 9200 can perform queue processing by checking device status, request priority, scheduling, and other factors as described herein. In some implementations, director processing is initiated to instantiate a director to find or instantiate a manager. In some implementations, a message bus can be used to determine a manager. Job processing can be initiated by the manager including instantiating or determining an appropriate controller/worker(s) to execute the job. Assignments and/or connections can be made between the controller/worker(s) and the device. A database can be updated with the relevant information, including job processing status.

The DCS controller 9300 can prepare tasks relevant to the job/request, negotiate a connection with the device and execute commands until completion. Upon completion of the tasks, the connection can be closed and the tasks can be closed, including providing a notification to the DCS core 9200 by updating a registry (e.g., the database 9400). The DCS core 9200 can tear down the controllers, release resources including registry resources, update a job registry, tear down a director, and release director resources.

The monitor 9500 can monitor DCS core 9200 and DCS controller 9300 operations. If an error is detected, the monitor 9500 can attempt to correct or remedy the error.

Figure 10:
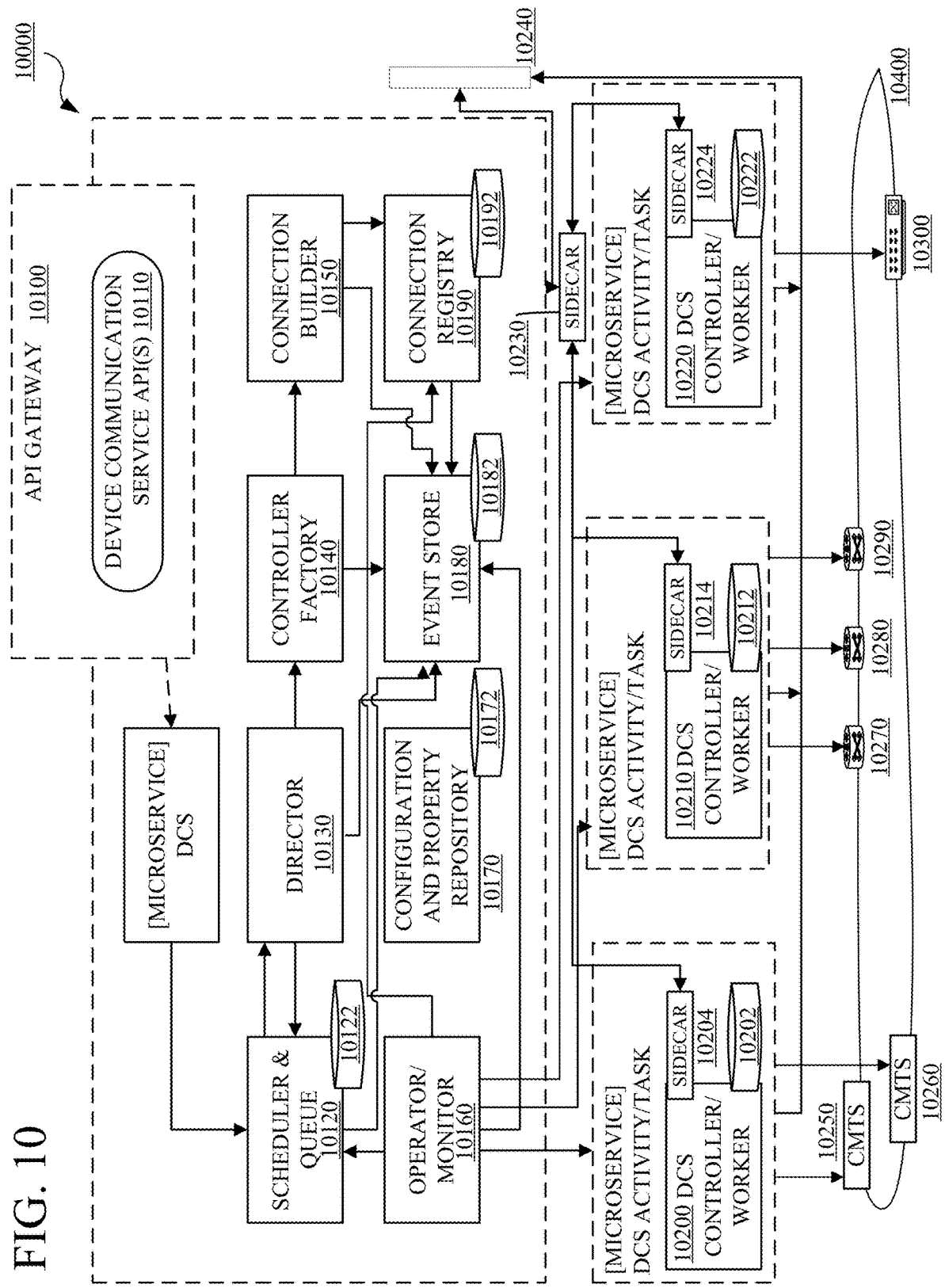
FIG. 10 is a diagram of an example of a device connectivity system or architecture in accordance with embodiments of this disclosure.

FIG. 10 is an example flow diagram 10000 for a DCS system in accordance with embodiments of this disclosure. The flow diagram 10000 is operative between a API gateway 10100 and/or a DCS API 10110, a scheduler and queuing service 10120 with a database 10122, a director 10130, a controller factory 10140, a connection builder 10150, an operator/monitor 10160, a configuration and property repository 10170 with a database 10172, an event store 10180 with a database 10182, a connection registry 10190 with a database 10192, controllers 10200, 10210, and 10220, each with a database 10202, 10212, and 10222 and a sidecar 10204, 10214, and 10224, a sidecar 10230, a message bus 10240, and devices including cable modem termination system (CMTSs) 10250 and 10260, routers 10270, 10280, and 10290, and a switch 10300, all operating on a network 10400. The flow diagram 10000 can be used with the system 1000 of FIG. 1, the system 2000 of FIG. 2, and the system 3000 of FIG. 3 and use the flow or swim diagrams of FIGS. 6-9, as appropriate and appliable. The communications between the described devices or elements can include wired communications, wireless communications, or a combination thereof. The swim diagram 10000 and elements therein are illustrative and may include additional, fewer, or different steps, flows, devices, entities, and the like which may be similarly or differently architected without departing from the scope of the specification and claims herein.

A request is received at the API gateway 10100 and/or the DCS API 10110. The scheduler and queuing service 10120 can apply prioritization, calendared events, load-balancing, and other factors to schedule and queue the request for the device and store the information in the database 10122. The scheduler and queuing service 10120 can send the jobs associated with the request to the director 10130, which can instantiate and/or request a controller using the controller factory 10140. The controller factory 10140 can instantiate the controller and register same in the connection registry 10190 and the database 10192. The connection builder 10150 can retrieve device and service properties from the configuration and property repository 10170 and the database 10172 to build a connection pool for the controller upon request by the controller factory 10140. The connection pool can be registered in the connection registry 10190 and the database 10192. The appropriate controllers 10200, 10210, and 10220 can manage execution of the jobs with respect to their associated devices, e.g., the CMTSs 10250 and 10260, the routers 10270, 10280, and 10290, and the switch 10300. Execution information can be stored in the respective databases 10202, 10212, and 10222. The sidecars 10204, 10214, and 10224 and the sidecar 10230 can be used to communicate messages between the components and to the message bus 10240, which can distribute events to other components. All events can be stored in the event store 10180 and the database 10182. The operator/monitor 10160 can monitor all activity, recordation, and registrations occurring as a result of the request.

Figure 11:
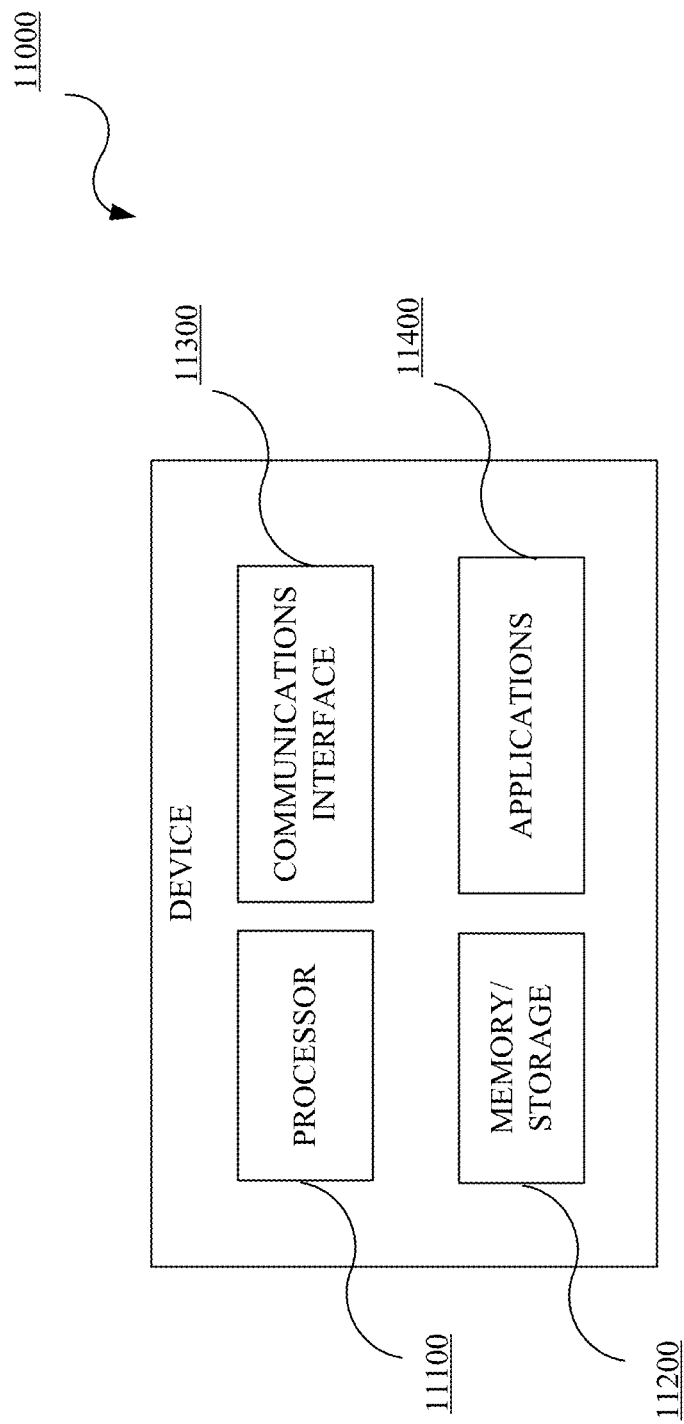
FIG. 11 is a block diagram of an example of a device in accordance with embodiments of this disclosure.

FIG. 11 is a block diagram of an example of a device 11000 in accordance with embodiments of this disclosure. The device 11000 may include, but is not limited to, a processor 11100, a memory/storage 11200, a communication interface 11300, and applications 11400. The device 11000 may include or implement, for example, the elements and/or components of the system 1000, system 2000, system 3000, system 4000, system 5000, the DCS 10000, the devices 10900, and the elements and/or components from the flow diagram 6000, the swim diagram 7000, the state diagram 8000, and the swim diagram 9000. The applicable or appropriate services, techniques or methods described herein may be stored in the memory/storage 11200 and executed by the processor 11100 in cooperation with the memory/storage 11200, the communications interface 11300, and the applications 11400, as appropriate. The device 11000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 12:
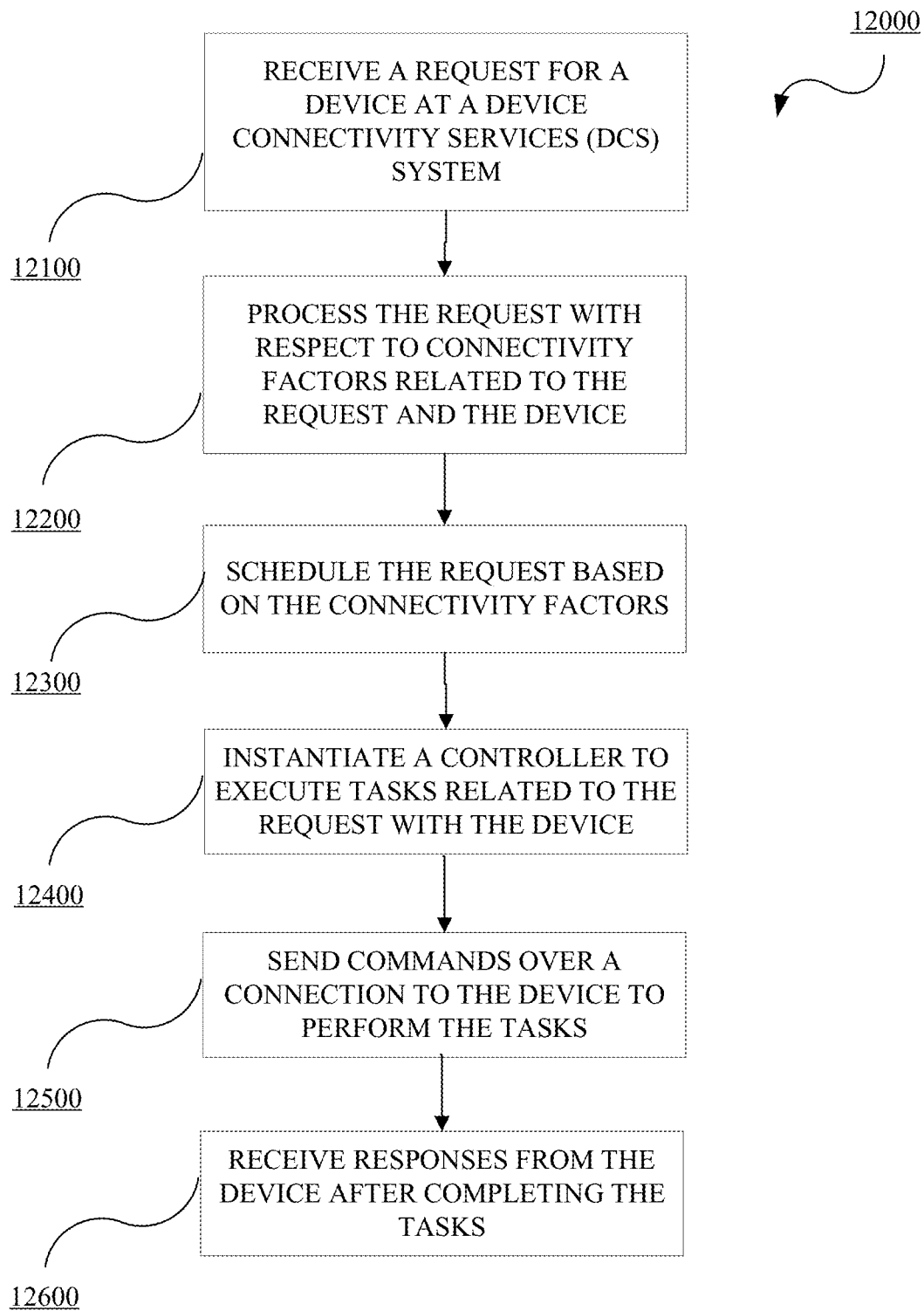
FIG. 12 is a flowchart of an example method for managing device connectivity using a device connectivity system in accordance with embodiments of this disclosure.

FIG. 12 is a flowchart of an example method 12000 for device connectivity in accordance with embodiments of this disclosure. The method 12000 includes: receiving 12100 a request for a device at a device connectivity services (DCS) system; processing 12200 the request with respect to connectivity factors related to the request and the device; scheduling 12300 the request based on the connectivity factors; instantiating 12400 a controller to execute tasks related to the request with the device; sending 12500 commands over a connection to the device to perform the tasks; and receiving 12600 responses from the device after completing the tasks. For example, the technique 12000 may be implemented, as applicable and appropriate, by the system 1000, system 2000, system 3000, system 4000, system 5000, the DCS 10000, the devices 10900, the processor 11100, the memory/storage 11200, the communication interface 11300, and the applications 11400, and the elements contained therein.

The method 12000 includes receiving 12100 a request for a device at a device connectivity services (DCS) system. A requesting entity can send a request toward a device via a DCS system. The request can be for maintenance, configuration change, on-demand, operations, customer service, audit, batch processing, telemetry, and the like. The DCS system can handle any type or form of request for any type or form of device.

The method 12000 includes processing 12200 the request with respect to connectivity factors related to the request and the device and scheduling 12300 the request based on the connectivity factors. The DCS system can handle a variety of connectivity factors with respect to the request and the device without impacting the device and its operations. These connectivity factors are described herein and include, but are not limited to, prioritization, contention, congestion, resource control, and related issues. The DCS system can determine how and when the request is to be handled by reviewing all request and device information. All decision and action information is stored in the DCS system. The DCS system includes a monitoring system to self-check operational functionality.

The method 12000 includes instantiating 12400 a controller to execute tasks related to the request with the device. Controllers can be instantiated to execute tasks related to a scheduled request. The controllers can perform checks to make sure device connectivity can be achieved. For example, this can include whether the device is in a locked state with respect to another controller.

The method 12000 includes sending 12500 commands over a connection to the device to perform the tasks and receiving 12600 responses from the device after completing the tasks. The controller can establish a connection with the device. In some implementations, an identity and state of a connection and session can be maintained to efficiently process further requests (associated with an initial request) over the established connection using the identity. Responses can be forwarded to the requesting entity.

The described methods and systems for device connectivity services can include, but is not limited to, a method for using device connectivity services. In some implementations, the method includes receiving, at a device connectivity services system, a request to connect with a device to perform one or more tasks at the device, processing, by the device connectivity services system, the request with respect to connectivity factors related to the request and the device, scheduling, by the device connectivity services system, the request based on the connectivity factors, instantiating, by the device connectivity services system, a controller to execute the one or more tasks at the device, sending, by the controller, one or more commands to the device over a connection to perform the one or more tasks, and receiving, by the controller, responses from the device over the connection after completing the one or more tasks.

In some implementations, the connectivity factors include at least prioritization, congestion, contention, and backpressure. In some implementations, the scheduling includes inserting the request in a queue based on a prioritization of the request. In some implementations, the method further includes maintaining, by the device connectivity services system, an identity for the connection to process future requests connected to the request. In some implementations, the identity alleviates having to establish connections for each of the future requests. In some implementations, the method further includes monitoring, by the device connectivity services system, operational functionality of the device connectivity services system as requests are being processed by the device connectivity services system. In some implementations, the method further includes correcting, by the device connectivity services system, errors in the operational functionality found during the monitoring. In some implementations, the method further includes checking, by the controller, whether the device is in a locked state with another controller, and performing the sending when the device is in an unlocked state. In some implementations, the method further includes re-assigning, by the device connectivity services system to a controller causing the locked state, the request when the device is in the locked state, and sending, by the controller causing the locked state, commands to the device over a connection to perform the one or more tasks.

The described methods and systems for device connectivity services can include, but is not limited to, a service provider system. In some implementations, the service provider system includes a device connectivity services core configured to receive a connection request for a network device, apply connectivity factors related to the connection request and the network device, queue the connection request based on the connectivity factors, and determine a device connectivity services worker to control execution of tasks associated with connection request. The device connectivity services worker configured to establish a connection to the network device, send commands over the established connection to instruct the network device to perform tasks associated with the connection request, and obtain responses from the network device over the established connection after the network device has completed the tasks.

In some implementations, the connectivity factors include at least prioritization, congestion, contention, and backpressure. In some implementations, placement in the queue is based on a priority level of the connection request. In some implementations, the device connectivity services core is further configured to maintain an identity for the connection to process additional connection requests related to the connection request. In some implementations, maintenance of the identity alleviates having to establish connections for each of the additional connection requests. In some implementations, the device connectivity services core is further configured to oversee operability of the device connectivity services system as connection requests are being processed by the device connectivity services system. In some implementations, the device connectivity services core is further configured to remedy errors found in the operability of the device connectivity services system. In some implementations, the device connectivity services worker is further configured to determine availability of the network device with respect to other device connectivity services workers, and publish the connection request to another device connectivity services worker associated with the network device, wherein the another device connectivity services worker is configured to control execution of the tasks. In some implementations, the service provider system further including a message bus connected to the device connectivity services core and the device connectivity services worker, the message bus configured to publish the connection request and the tasks for access and action by the device connectivity services worker and components of the device connectivity services core.

The described methods and systems for device connectivity services can include, but is not limited to, a device connectivity services system. In some implementations, the device connectivity services system includes a device connectivity services core and a device connectivity services worker. The device connectivity services core configured to receive a connection request for a network device, apply connectivity factors related to the connection request and the network device to schedule the connection request on a queue, and publish the connection request and tasks related to the connection request on a message bus. The device connectivity services worker configured to pull the connection request and the tasks from the message bus, send commands to the network device to perform the tasks, and receive responses from the network device after the network device has completed the tasks.

In some implementations, the device connectivity services worker is further configured to determine whether the network device is in a locked state with another device connectivity services worker, and publish the connection request and the tasks to the another device connectivity services worker when the network device is in the locked state with the another device connectivity services worker, wherein the another device connectivity services worker is configured to send commands to the network device to perform the tasks.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for using device connectivity services, the method comprising:
    receiving, at a device connectivity services system, a request to connect with a device to perform one or more tasks at the device;
    scheduling, by the device connectivity services system, the request based on connectivity factors, wherein the connectivity factors include prioritization, congestion, contention, and back-pressure;
    instantiating, by the device connectivity services system, a controller to execute the one or more tasks at the device;
    checking, by the controller, whether the device is in a locked state with another controller;
    re-assigning, by the device connectivity services system to a controller causing the locked state, the request when the device is in the locked state;
    sending, by one of the controller or the controller causing the locked state, one or more commands to the device to perform the one or more tasks; and
    receiving, by the one of the controller or the controller causing the locked state, responses from the device after completing the one or more tasks.

2. The method of claim 1, wherein the instantiating of the controller is based on the scheduling of the request.

3. The method of claim 1, wherein the scheduling includes inserting the request in a queue based on a prioritization of the request.

4. The method of claim 1, further comprising:
    maintaining, by the device connectivity services system, an identity for a connection between the controller and the device to process future requests connected to the request; and
    enabling, by the device connectivity services system, a stateful channel between the device connectivity services system and the device to prioritize messages based on the identity.

5. The method of claim 4, wherein the identity alleviates having to establish connections for each of the future requests.

6. The method of claim 1, further comprising:
    monitoring, by the device connectivity services system, operational functionality of the device connectivity services system as requests are being processed by the device connectivity services system.

7. The method of claim 6, further comprising:
    correcting, by the device connectivity services system, errors in the operational functionality found during the monitoring.

8. The method of claim 1, further comprising:
    establishing, by the controller, a connection with the device.

9. The method of claim 8,
    wherein the commands to the device when sent from the controller are sent over the established connection to perform the one or more tasks.

10. A service provider system, comprising:
    a device connectivity services core comprising one or more processors and a memory with instructions executable by the one or more processors to cause the device connectivity services core to perform operations configured to:
        receive a connection request for a network device;
        apply connectivity factors related to the connection request and the network device;
        queue the connection request based on the connectivity factors; and
        in response to queuing of the connection request, instantiate a device connectivity services worker to control execution of tasks associated with connection request; and
    the device connectivity services worker comprising one or more processors and a memory with instructions executable by the one or more processors to cause the device connectivity services worker to perform operations to:
        establish a connection to the network device;
        send commands over the established connection to instruct the network device to perform tasks associated with the connection request; and
        obtain responses from the network device over the established connection after the network device has completed the tasks.

11. The service provider system of claim 10, wherein the connectivity factors include at least prioritization, congestion, contention, and back-pressure.

12. The service provider system of claim 10, wherein placement in the queue is based on a priority level of the connection request.

13. The service provider system of claim 10, wherein the memory includes further instructions executable by the one or more processors to cause the device connectivity services core to perform operations to:
    maintain an identity for the connection to process additional connection requests related to the connection request, and
    enable a stateful channel between the device connectivity services worker and the network device to prioritize messages based on the identity.

14. The service provider system of claim 13, wherein maintenance of the identity alleviates having to establish connections for each of the additional connection requests.

15. The service provider system of claim 10, wherein the memory includes further instructions executable by the one or more processors to cause the device connectivity services core to perform operations to:
oversee operability of the device connectivity services system as connection requests are being processed by the device connectivity services system.

16. The service provider system of claim 15, wherein the memory includes further instructions executable by the one or more processors to cause the device connectivity services core to perform operations to:
remedy errors found in the operability of the device connectivity services system.

17. The service provider system of claim 10, wherein the memory includes further instructions executable by the one or more processors to cause the device connectivity services worker to perform operations to:
determine availability of the network device with respect to other device connectivity services workers; and
publish the connection request to another device connectivity services worker associated with the network device, wherein the another device connectivity services worker is configured to control execution of the tasks.

18. The service provider system of claim 10, further comprising:
a message bus connected to the device connectivity services core and the device connectivity services worker, the message bus configured to publish the connection request and the tasks for access and action by the device connectivity services worker and components of the device connectivity services core.

19. A device connectivity services system, comprising:
a device connectivity services core comprising one or more processors and a memory with instructions executable by the one or more processors to cause the device connectivity services core to perform operations configured to:
receive a connection request for a network device;
apply connectivity factors related to the connection request and the network device to schedule the connection request on a queue, wherein the connectivity factors include prioritization, congestion, contention, and back-pressure; and
publish the connection request and tasks related to the connection request on a message bus;
a device connectivity services worker comprising one or more processors and a memory with instructions executable by the one or more processors to cause the device connectivity services worker to perform operations configured to:
pull the connection request and the tasks from the message bus;
determine whether the network device is in a locked state with another device connectivity services worker;
publish the connection request and the tasks to the another device connectivity services worker when the network device is in the locked state with the another device connectivity services worker, wherein the another device connectivity services worker is configured to send commands to the network device to perform the tasks;
send commands to the network device to perform the tasks when the network device is in an unlocked state; and
receive responses from the network device after the network device has completed the tasks,
wherein the device connectivity services worker is instantiated based on scheduling of the connection request.

\* \* \* \* \*